(12) United States Patent
Tkac et al.

(10) Patent No.: US 8,769,242 B2
(45) Date of Patent: Jul. 1, 2014

(54) TRANSLATION MAP SIMPLIFICATION

(75) Inventors: Vincent Tkac, Dublin, OH (US); Keith Shafer, Dublin, OH (US); Michael R. Ingardia, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 13/372,686

(22) Filed: Feb. 14, 2012

(65) Prior Publication Data

US 2013/0212351 A1 Aug. 15, 2013

(51) Int. Cl.
*G06F 9/26* (2006.01)
*G06F 9/34* (2006.01)

(52) U.S. Cl.
USPC .................... 711/206; 711/202; 711/E12.058

(58) Field of Classification Search
None
See application file for complete search history.

(56) References Cited

U.S. PATENT DOCUMENTS

| 2007/0083850 | A1 | 4/2007 | Kapoor et al. |
| 2007/0174308 | A1 | 7/2007 | Rausch |
| 2009/0043778 | A1 | 2/2009 | Jambunathan et al. |
| 2009/0150367 | A1* | 6/2009 | Melnik et al. ..................... 707/4 |

* cited by examiner

*Primary Examiner* — Eric S Cardwell
(74) *Attorney, Agent, or Firm* — Charles L. Moore; Moore & Van Allen PLLC

(57) ABSTRACT

A method for translation map simplification may include determining a translation map based on a predetermined criterion in response to receiving input data. The method may also include determining if the translation map extends another map or a referenced map and determining if the translation map includes at least one map fragment. The referenced map is loaded in response to a determination that the translation map includes an extension of the referenced map. The map fragment is loaded in response to a determination that the translation map comprises the map fragment. A new map is compiled based on at least the translation map, the referenced map and the at least one map fragment, in response to the translation map not including a new map reference or a modification to the translation map. The input data is processed based on the new map to produce translated data specific to the new map.

22 Claims, 7 Drawing Sheets

TRANSLATION MAP SIMPLIFICATION

BACKGROUND

Aspects of the present invention relate to data mapping and translation maps to map data from one format to another format, and more particularly to translation map simplification.

Data mapping may be defined as a process for creating data element mappings or defining relationships between two distinct data models or formats for representing data. Data mapping may be used as a first step for a wide variety of data integration tasks. Examples of such data integration tasks may include but is not necessarily limited to data transformation or data mediation between a data source and a destination; identification of data relationships as part of data lineage analysis; the discovery of hidden sensitive data such as the last four digits of a social security number hidden in another user id as part of a data masking or de-identification project; and consolidation of multiple databases into a single database and identifying redundant columns of data for consolidation or elimination. For example, a company that would like to transmit and receive purchase orders and invoices with another company or a business partner may use data mapping to create data maps from a company's data to standardized American National Standards Institute Accredited Standards Committee X12 (ANSI ASC X12) messages or similar messages for items such as purchase orders and invoices. While standards may be generic, Electronic Data Interchange (EDI) standards are designed to allow a company to exchange data with any other company, regardless of industry.

Translation maps are used to map data from one format or data model to another format or data model. Companies may generate many custom maps based on data origin and subsequent use. Often these maps are similar, especially in business to business (B2B) scenarios where maps are based on standards, such as those discussed above, but partners may implement variations or may have specific content interpretations. These minor differences can cause a large number of translation maps to be created and maintained. Map reuse across partners is highly desirable but these mapping differences result in complexity and difficulties in translating the data from one company or partner to another.

BRIEF SUMMARY

According to an aspect of the present invention, a method for translation map simplification may include receiving input data by a computer device and determining, by the computer device, a translation map based on a predetermined criterion in response to receiving the input data. The translation map, determined based on the predetermined criterion, may be loaded on the computer device. The method may also include determining, by the computer device, if the translation map extends another map. The other map may be or may include a referenced map. The method may additionally include determining, by the computer device, if the translation map includes at least one map fragment. The referenced map is loaded in response to a determination that the translation map comprises an extension of the referenced map and the at least one map fragment is loaded in response to a determination that the translation map comprises at least one map fragment. A new map is compiled based on at least the translation map, the referenced map and the at least one map fragment, in response to determining that the translation map does not include at least one of a new map reference and a modification to the translation map. The method may further include processing the input data, by the computer device, based on the new map to produce translated data specific to the new map.

According to another aspect of the present invention, a system for translation map simplification may include a processor and a translation engine operable on the processor. The translation engine may include a module to determine a translation map based on a predetermined criterion in response to receiving input data and a module to load the translation map determined based on the predetermined criterion. The translation engine may also include a module to determine if the translation map extends another map. The other map may include a referenced map. The translation engine may also include a module to determine if the translation map includes at least one map fragment. The translation engine may additionally include a module to load the referenced map in response to a determination that the translation map includes an extension of the referenced map and a module to load the at least one map fragment in response to a determination that the translation map includes the at least one map fragment. The system may further include a compiler operable on the processor to compile a new map based on at least the translation map, the referenced map and the at least one map fragment, in response to the translation map not including at least one of a new map reference and a modification to the translation map. The input data may be processed based on the compiled new map to produce translated data specific to the new map.

According to a further aspect of the present invention, a computer program product for translation map simplification may include a computer readable storage medium having computer readable program code embodied therewith. The computer readable program code may include computer readable program code configured to receive input data and computer readable program code configured to determine a translation map based on a predetermined criterion in response to receiving the input data. The computer readable program code may also include computer readable program code configured to load the translation map determined based on the predetermined criterion. The computer readable program code may additionally include computer readable program code configured to determine if the translation map extends another map. The other map may include a referenced map. The computer readable program code may also include computer readable program code configured to determine if the translation map includes at least one map fragment. The computer readable program code may additionally include computer readable program code configured to load the referenced map in response to a determination that the translation map comprises an extension of the referenced map and computer readable program code configured to load the at least one map fragment in response to a determination that the translation map comprises the at least one map fragment. The computer readable program code may further include computer readable program code configured to compile a new map based on at least the translation map, the referenced map and the at least one map fragment, in response to the translation map not including at least one of a new map reference and a modification to the translation map. The computer readable program code may further include computer readable program code configured to process the input data based on the new map to produce translated data specific to the new map.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
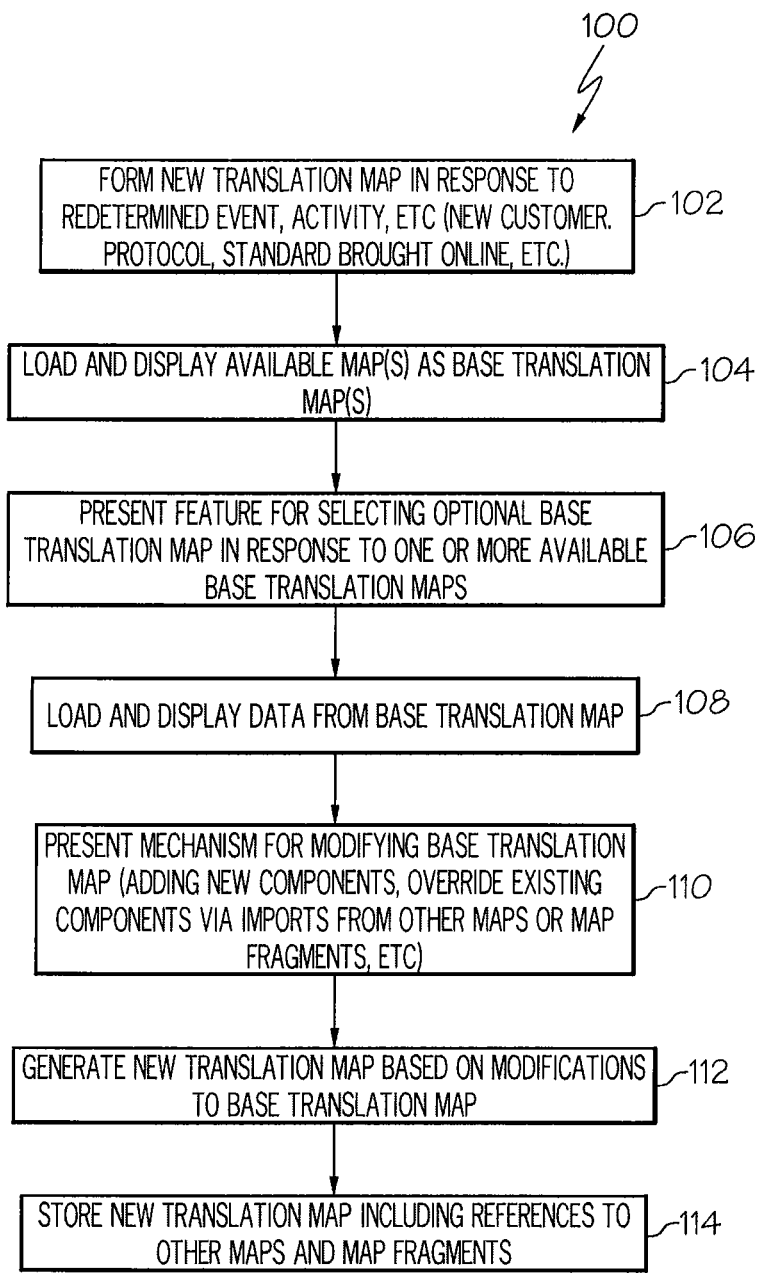
FIG. 1 is a flow chart of an example of a method for generating a new translation map in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of an example of a method 100 for generating a new translation map in accordance with an embodiment of the present invention. In block 102, a new translation map may be formed or generated in response to a predetermined event. The predetermined event may be an activity, such as a new customer for a business or business partner, a new protocol or process for doing business, such as sales or other business process, a new standard brought on line or other event or activity that may result in the generation of data which may be shared with another entity or business partner and may, therefore, be mapped or translated between different data models or formats.

In block 104, an available data map or maps may be loaded and displayed as a possible base translation map or maps. The available map or maps may be loaded by a mapping tool operating or running on a processor of a computer device or the like similar to that described herein and displayed to a user on a computer monitor or screen associated with the computer device.

In block 106, a feature or mechanism may be presented to the user for selecting an optional base translation map from the one or more available base translation maps loaded and displayed. The feature or mechanism for selecting the optional base translation map may be presented or displayed in association with each of the available base translation maps. The feature or mechanism for selecting the base translation map may include a button, icon or other feature similar to those known in the computing arts for selecting between alternatives using a computer pointing device or other tool.

Figure 3:
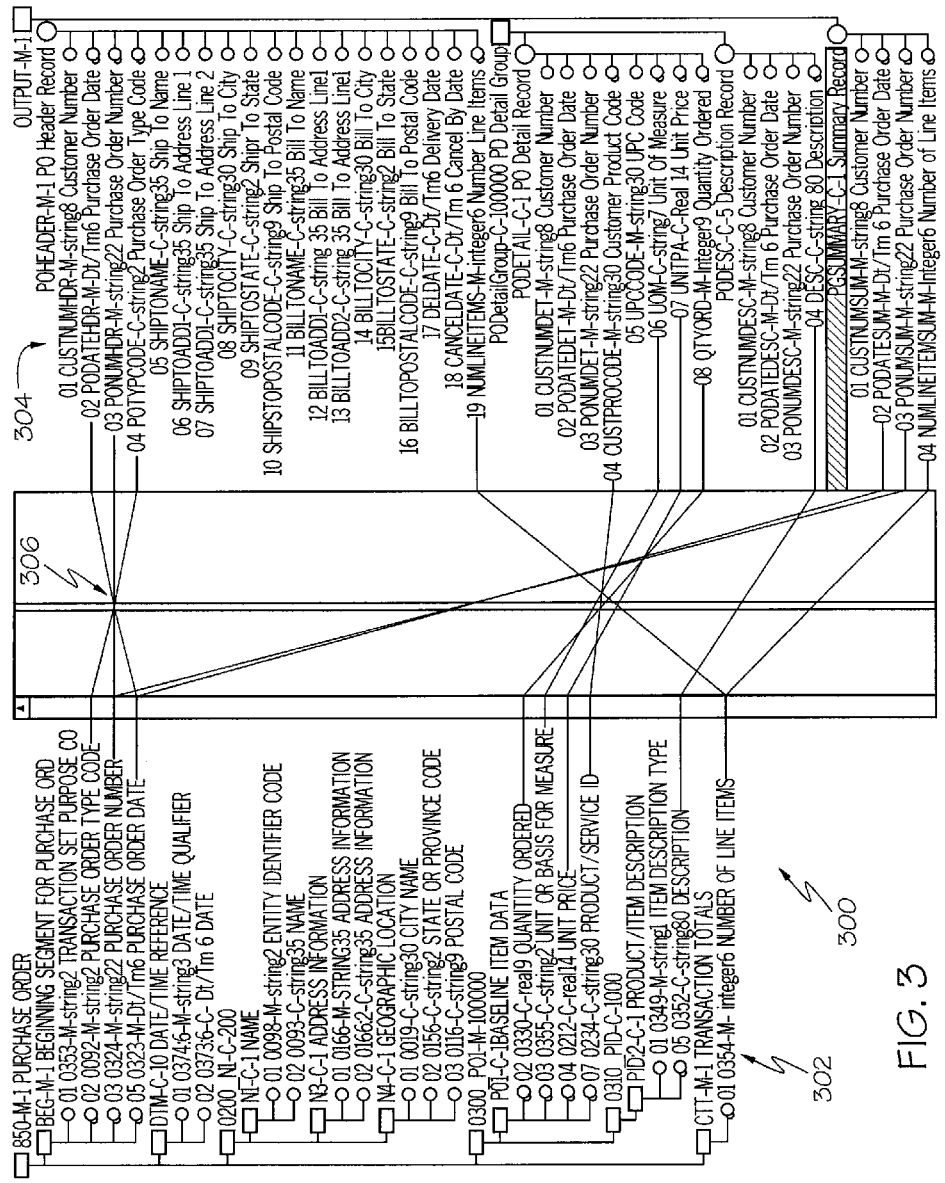
FIG. 3 is an example of a baseline translation map in accordance with an embodiment of the present invention.

In block 108, data from the selected base translation map may be loaded and displayed. An example of a base or baseline translation map is illustrated in FIG. 3.

Figure 4:
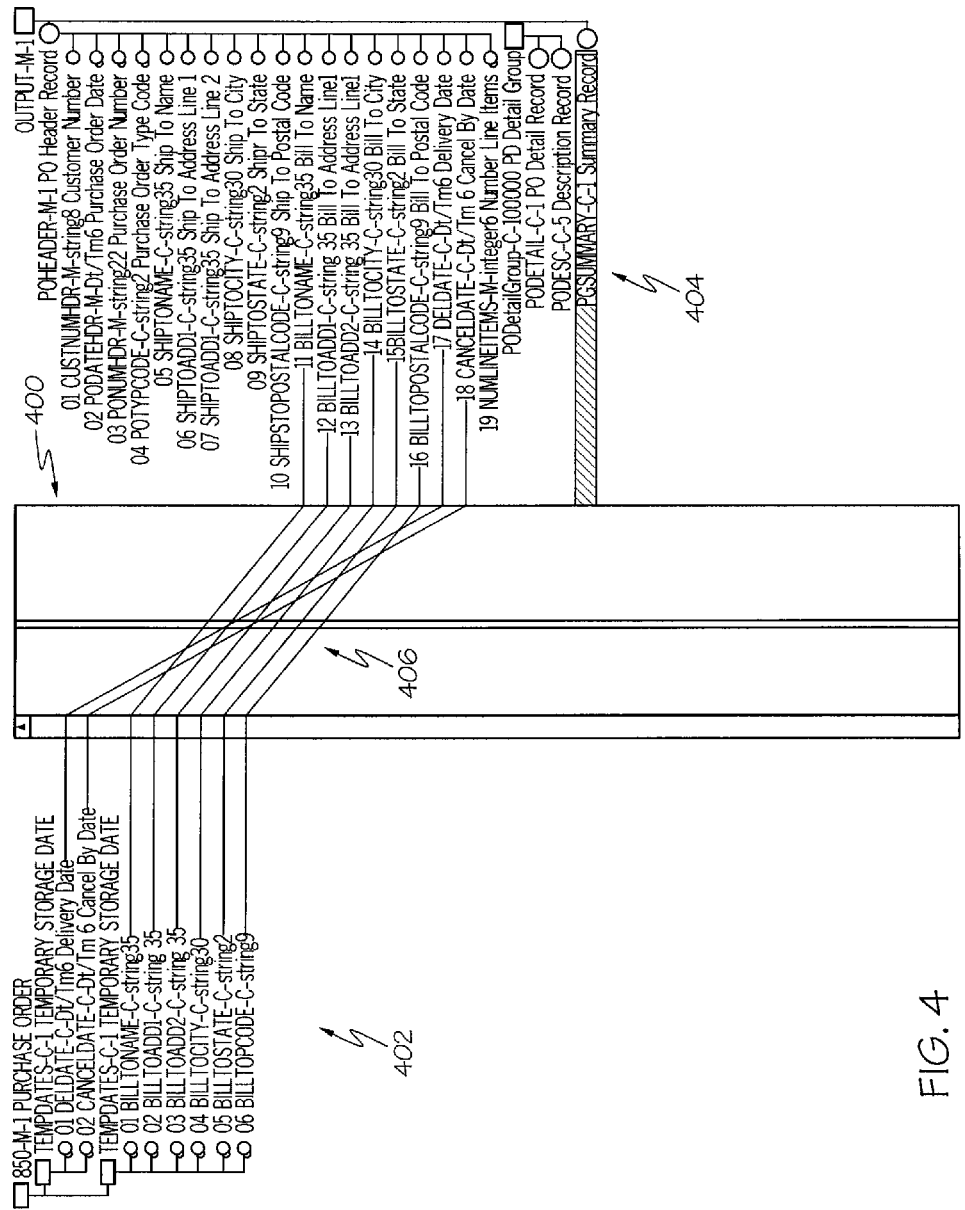
FIG. 4 is an example of a map fragment in accordance with an embodiment of the present invention.

In block 110, a feature or mechanism may be presented to the user for modifying the base translation map. The feature or mechanism for modifying the base translation map may be any sort of mechanism known in the computing arts for performing modification of content presented on a computer screen or via a programming application programming interface (API). Modifications that may be made to the base translation map may include but is not necessarily limited to adding a new component, overriding an existing component by importing a component from another map, importing or incorporating a map fragment from another map or any other modification that may be made to the map. A component of the translation map may be a particular category or type of data entry or data field for containing a particular type or category of data in the map. A map fragment may be a portion of another map that may include several lines of data or fields for containing specific types or categories of data. The lines or fields of data may be different types or categories of data but may be related in some way. For example, the fields and structure where the name and address information of a customer name and address is associated with billing or other information. An example of a map fragment is illustrated in FIG. 4. Each map fragment or fragment map may be a full map in it own respect and may include its own base map and fragment maps or fragment references.

Figure 5:
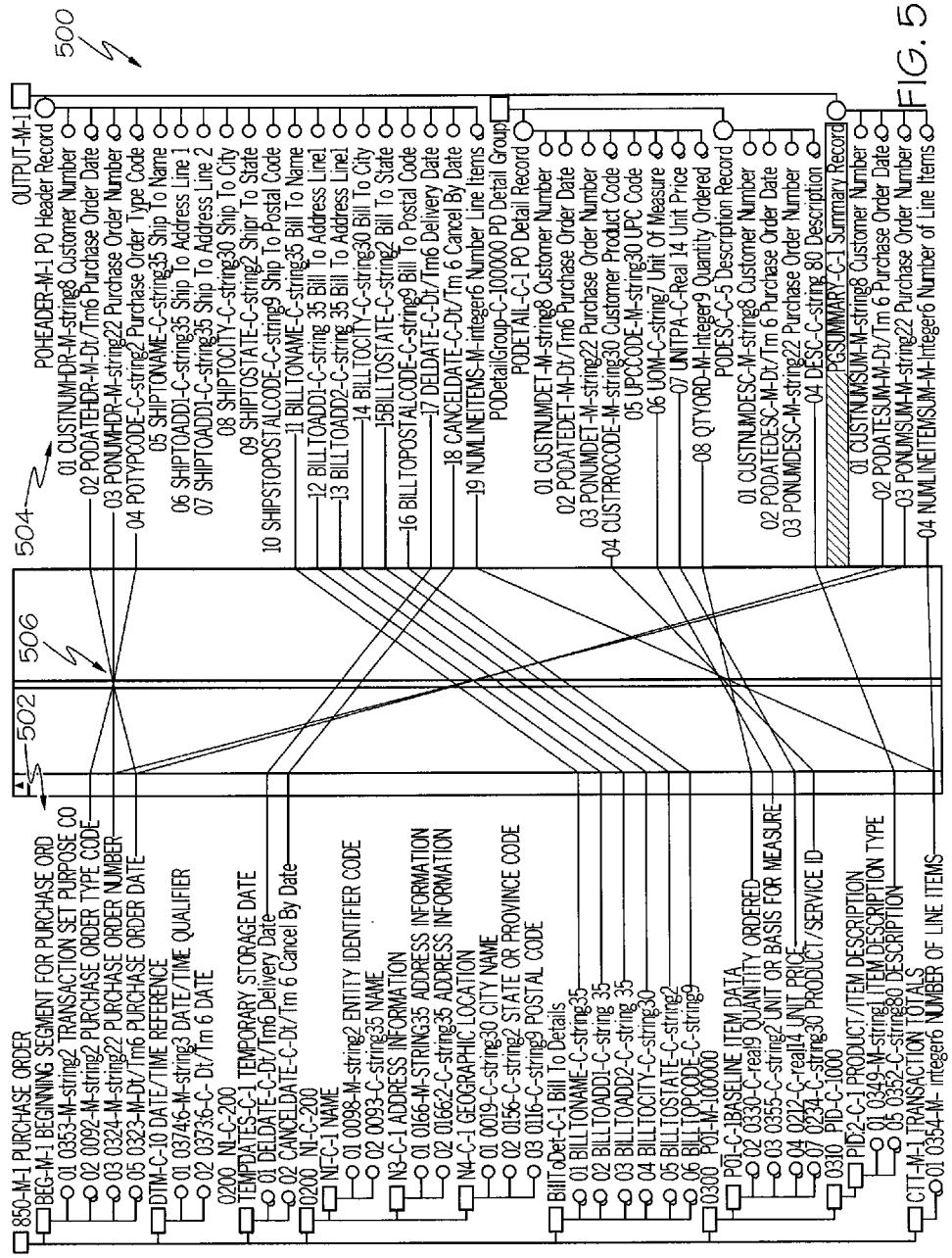
FIG. 5 is an example of a full or combined translation map in accordance with an embodiment of the present invention.

In block 112, a new translation map may be generated based on the modifications to the base translation map. The new translation map may include the base translation map with all of the modifications made to the base translation map being incorporated. An example of a new translation map 500 is illustrated in FIG. 5. The new translation map in FIG. 5 is a combination of the base translation map 300 in FIG. 3 and the map fragment 400 in FIG. 4.

In block 114, the new translation map including any references to other maps (referenced maps) and map fragments may be stored in a maps and map fragments data storage device similar to that described with reference to FIG. 6. The data storage device may be a database, file system, data source or other storage device.

Figure 2A:
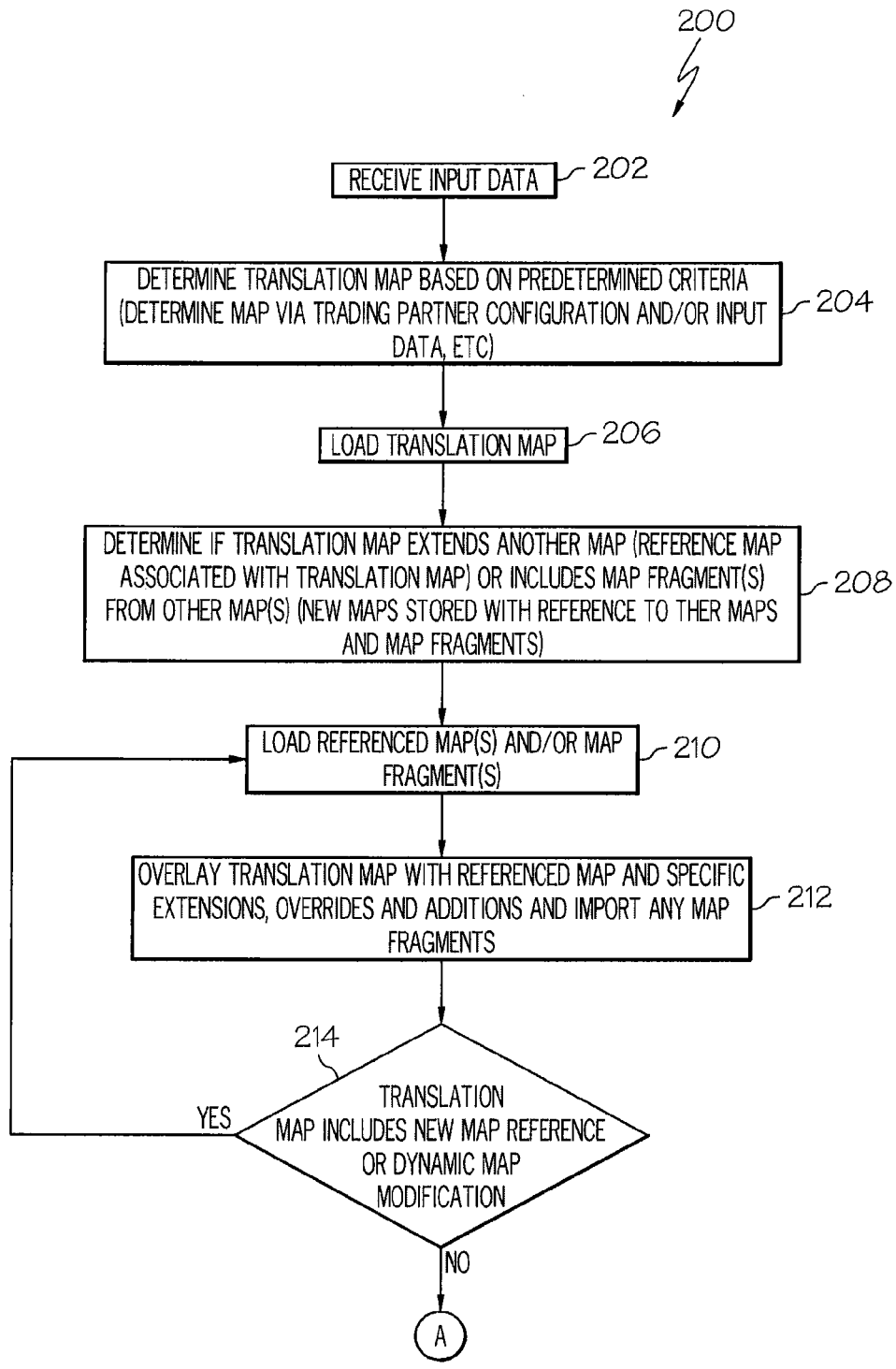
FIGS. 2A and 2B (collectively FIG. 2) are a flow chart of an example of a method for translating data based on simplification of a translation map in accordance with an embodiment of the present invention.
Figure 2B:
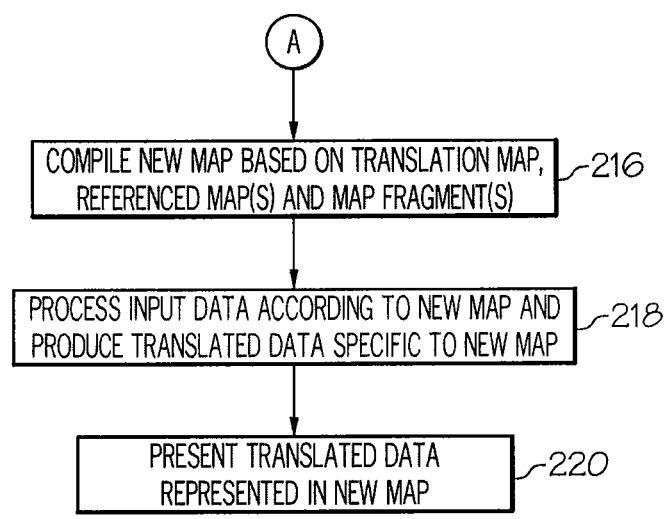

FIGS. 2A and 2B (collectively FIG. 2) are a flow chart of an example of a method 200 for translating data based on simplification of a translation map in accordance with an embodiment of the present invention. In block 202, input data may be received. The input data may be received by a translation engine running or operating on a processor of a computer device.

In block 204, a translation map for translating or mapping the input data to a different format or data model may be determined based on a predetermined criterion or criteria. The predetermined criterion or criteria for determining the translation map may include but is not necessarily limited to a trading partner configuration of the data or a data model used by a trading partner, a nature or format of the input data, a combination of the criteria, and/or other criteria that may determine a particular translation map of a plurality of translation maps that may be used for translating or mapping the input data to a desired data format or model.

In block 206, the translation map determined based on the predetermined criteria may be loaded on the computer device or processor associated with the computer device.

In block 208, a determination may be made if the translation map extends another map or includes a map fragment or fragments from another map or maps. The other map may be a referenced map associated with the translation map. The translation map may extend the other map by referencing the other map for including components of the other map. Accordingly, a map may make reference to another map as a base map and in doing so may acquire the content of the referenced map. As previously described with reference to block 114 in FIG. 1, a new translation map may be compiled and optionally stored including references to other maps and map fragments or fragment maps. Each base map and map fragment may be a full map in its own respect and may include its own base and fragment references or fragment maps. The base and fragment maps may also reference other maps and fragment maps and so forth. As described herein, maps, map fragments or fragment maps which are referenced in other maps may be iteratively or recursively loaded and added to the translation map or base translation map.

In block 210, any referenced map or maps may be loaded on the computer device or processor in response to a determination that the translation map includes an extension or a referenced map or maps. Any map fragment or fragments may also be loaded on the computer device or processor in response to a determination that the translation map includes at least one map fragment.

In block 212, the translation map may be overlaid with the referenced map or maps including specific extensions, overrides and additions to the referenced map and any map fragments may be imported into the translation map. By overlaying the translation map with the referenced map or maps, the different types or categories of data or data fields associated with the referenced maps are considered or used with the selected translation map in translating or mapping the input data to the new map, data format or model. Similarly, importing the map fragments into the translation map utilizes the data fields in the map fragment or fragments in translating or mapping the input data to the new map, data format or model. As described herein, the selected translation map may be combined with the referenced map or maps and map fragments to generate a new map for translating the input data.

An object inheritance model may be used to allow the override and extension of a translation map. The object inheritance model may be similar to object inheritance in object oriented programming. The object inheritance model may be used when implementing updated versions of a standard as a way to implement just the differences between the versions. The updated version may then be tested knowing that the previous version worked since the corresponding implementation would be unaffected. Any fixes in the previous version of the translation map may also be automatically consumed by the updated version. Maps can specify overrides and inclusions based on data, partner information, metadata, input fields and output fields. An example of an input field override may specify that a particular input field should map to the output field specified instead of what is defined in the base map. An example of an output field override may include specifying that a particular output field should map from a particular specified input field instead of what is defined in the map base.

An extension mechanism may be used to extend standard maps shipped with a product or shared in a community but still have the ability to take updates of those maps as changes are made and bugs are fixed.

In block 214, a determination may be made if the translation map includes a new map reference or references or a dynamic map modification or modifications. If the translation map includes a new map reference or dynamic map modification, the method 200 may return to block 210 and the method 200 may proceed similar to that previously described. The method 200 may loop back to block 210 because the included map may itself have a base map or reference map fragment. As previously described, each base and fragment map may be a full map in its own respect and may include its own base and fragment references. The process or method may continue as described herein until there are no additional base or fragment references or maps to be included in the new map. This process of including all base and/or fragment referenced maps may be done recursively or iteratively.

If the translation map does not include a new map reference or a dynamic map modification in block 214, the method 200 may advance to block 216. In block 216, a new map may be compiled. The new map may be compiled based on the translation map, any referenced map or maps and any map fragments.

In block 218, the input data may be processed based on or according to the new map. Translated data specific to the new map may be produced by processing the input data using the new map.

In block 220, the translated data may be presented. The translated data may be represented in the new map or according to the new map.

FIG. 3 is an example of a baseline translation map 300 in accordance with an embodiment of the present invention. As illustrated in FIG. 3, data or map components in a first format 302 or data model may be mapped to corresponding map components in a second format 304 or model. Corresponding map components are linked or mapped by lines 306 extending between the respective corresponding components of the different formats 302 and 304.

FIG. 4 is an example of a map fragment 400 in accordance with an embodiment of the present invention. Similar to FIG. 3, components in a first format 402 are linked or mapped by lines 406 to corresponding components in a second format 404.

FIG. 5 is an example of a full or combined translation map 500 in accordance with an embodiment of the present invention. The full or combined translation map 500 may include the combined components of the base translation map 300 and the map fragment 400. Similar to FIGS. 3 and 4, components in a first format 502 or data model are linked or mapped by lines 506 to corresponding components in a second format 504 or data model.

Figure 6:
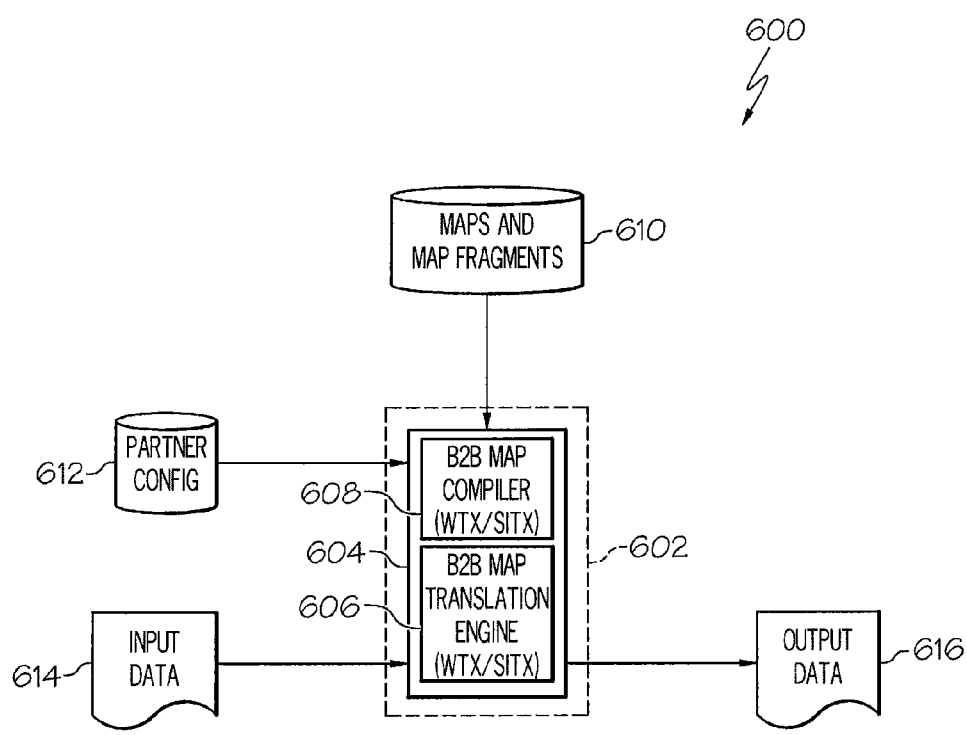
FIG. 6 is a block schematic diagram of an example of a system for translation map simplification in accordance with an embodiment of the present invention.

FIG. 6 is a block schematic diagram of an example of a system 600 for translation map simplification in accordance with an embodiment of the present invention. The methods 100 and 200 in FIGS. 1, 2A and 2B may be embodied in and performed by the system 600. The system 600 may include a computer device 602. The computer device may be a server or other computer device. The computer device 602 may include a processor 604.

The system 600 may also include a translation engine 606 and a map compiler 608 which may run on the processor 604. The translation engine 606 may be a business to business (B2B) translation engine, and the map compiler may be a B2B map compiler. Both the translation engine 606 and map compiler 608 may be adapted for operation with IBM WebSphere Transformation Extender (WTX) maps and Sterling Integrator Translator (SITX) maps. IBM and WebSphere are trademarks of International Business Machines Corporation in the United States, other countries or both. The method 200 in FIGS. 2A and 2B may be embodied in and performed by the translation engine 606. The compiler 604 may compile the new map in block 216 of FIG. 2B.

The system 600 may also include a maps and map fragments data storage device 610 to store referenced maps, map fragments and new translation maps. The data storage device 610 may be but is not necessarily limited to a database, file system, data source or other device. The system 600 may additionally include a Partner Configuration data storage device 612 to store configurations of data formats or data models for different partners, business associates, customers or other entities that may be used in translating and mapping data from one format or model to another format similar to that described herein.

Similar to that previously described, the translation engine 606 may receive the input data 614 (block 202 in FIG. 2A). The translation engines 606 may then perform functions similar to those described with respect to method 200 in FIGS. 2A and 2B to produce translated data or output data 616 specific to a new map generated by the translation engine 606 and map compiler 608.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for translation map simplification, comprising:
a processor;
a translation engine operable on the processor, wherein the translation engine comprises:
a module to determine a translation map based on a predetermined criterion in response to receiving input data, the translation map being configured for translating the input data from a first format or data model to a second format or data model that is presented in a new map;
a module to load the translation map;
a module to determine if the translation map extends another map, the other map comprising a referenced map;
a module to determine if the translation map comprises at least one map fragment;
a module to load the referenced map in response to a determination that the translation map comprises an extension of the referenced map;
a module to load the at least one map fragment in response to a determination that the translation map comprises the at least one map fragment; and
wherein the system further comprises a compiler operable on the processor to compile the new map based on combining at least the translation map, the referenced map and the at least one map fragment, in response to the translation map not including at least one of a new map reference and a modification to the translation map, and wherein the input data is processed based on the new map to produce translated data specific to the new map.

2. The system of claim 1, further comprising:
a data storage device associated with the processor for storing maps and map fragments; and
another data storage device associated with the processor for storing partner configurations.

3. The system of claim 1, further comprising a module to present the translated data represented by the new map.

4. The system of claim 1, further comprising a module for overlaying the translation map with the referenced map in response to loading the referenced map.

5. The system of claim 4, wherein the translation map is overlaid with the referenced map with each extension, override and addition of the referenced map.

6. The system of claim 1, further comprising a module to import any map fragments to the translation map.

7. The system of claim 1, further comprising:
a module to import any map fragments to the reference map; and
a module to overlay the translation map with the referenced map including each extension, override and addition of the referenced map.

8. The system of claim 1, wherein the translation map is determined from a plurality of base translation maps stored in a data storage device.

9. The system of claim 8, wherein the predetermined criterion to determine the translation map comprises at least one of a partner configuration and based on the input data.

10. The system of claim 1, wherein the referenced map comprises at least one other referenced map and the at least one map fragment comprises at least one other fragment map, the at least one other referenced map and the at least one other fragment map being recursively loaded.

11. The system of claim 1, wherein a new translation map is formed in response to a predetermined event, the predetermined event comprising at least one of a new customer, a new protocol and a new standard.

12. The system of claim 11, wherein a base translation map is selected from one or more available base translation maps.

13. The system of claim 12, wherein data is loaded and displayed from the selected base translation map.

14. The system of claim 13, further comprising presenting a mechanism for modifying the selected base translation map.

15. The system of claim 14, wherein the mechanism for modifying the selected base translation map comprises a feature for at least one of:
adding at least one component;
overriding an existing component by importing a component from another map into the selected base translation map;
importing a map fragment into the selected base translation map; and
recursively adding referenced maps and map fragments to the selected base translation map.

16. The system of claim 15, wherein a new translation map is generated based on the modification to the selected base translation map.

17. The system of claim 16, wherein the new translation map is stored including any reference to other maps and map fragments.

18. The system of claim 1, wherein the translation map extends the other map by making reference to the other map, the translation map acquiring contents of the other map.

19. The system of claim 1, wherein the reference map is added to the translation map in response to loading the reference map and the at least one map fragment is added to the translation map in response to loading the at least one map fragment.

20. The system of claim 1, further comprising a module that links a component in the first format or data model to a corresponding component in the second format or data model by a line in the new map.

21. A computer program product for translation map simplification, the computer program product comprising:
a computer readable storage medium having computer readable program code embodied therewith, the computer readable program code comprising:
computer readable program code configured to receive input data;
computer readable program code configured to determine a translation map based on a predetermined criterion in response to receiving the input data, the translation map being configured for translating the input data from a first format or data model to a second format or data model that is presented in a new map;
computer readable program code configured to load the translation map determined based on the predetermined criterion;
computer readable program code configured to determine if the translation map extends another map, the other map comprising a referenced map;
computer readable program code configured to determine if the translation map comprises at least one map fragment;

computer readable program code configured to load the referenced map in response to a determination that the translation map comprises an extension of the referenced map;

computer readable program code configured to load the at least one map fragment in response to a determination that the translation map comprises the at least one map fragment;

computer readable program code configured to compile the new map based on combining at least the translation map, the referenced map and the at least one map fragment, in response to the translation map not including at least one of a new map reference and a modification to the translation map; and computer readable program code configured to process the input data based on the new map to produce translated data specific to the new map.

22. The computer program product of claim 21, further comprising computer readable program code configured to overlay the translation map with the referenced map including each extension, override and addition of the referenced map.

\* \* \* \* \*